Sept. 17, 1929.  M. KNIGHT  1,728,554

INDICATING DEVICE

Filed Oct. 29, 1925

WITNESSES:
R.S. Williams
F.H. Miller

INVENTOR
Montgomery Knight

BY
Wesley G. Carr
ATTORNEY

Patented Sept. 17, 1929

1,728,554

UNITED STATES PATENT OFFICE

MONTGOMERY KNIGHT, OF HOLYOKE, MASSACHUSETTS, ASSIGNOR TO WESTINGHOUSE ELECTRIC AND MANUFACTURING COMPANY, A CORPORATION OF PENNSYLVANIA

INDICATING DEVICE

Application filed October 29, 1925. Serial No. 65,634.

My invention relates to indicating devices and particularly to means for determining differences in the relative movement between moving bodies.

One object of my invention is to provide a device of the above indicated character that shall be simple and durable in construction, economical to manufacture and effective in its operation.

Another object of my invention is to provide means for measuring in terms of per cent the difference between the relative movements of moving elements.

Another object of my invention is to provide a balance indicator that shall have a restoring torque substantially proportional to its unbalancing forces.

More particularly, a further object of my invention is to provide a simple and effective means for quickly determining the relative rotational velocities of standard and test meter elements of the induction or watthour type.

In testing watthour and similar meters, it is usual to compare the speed of rotation of the meters under test to that of a standard meter in order that the meter under test may be made to operate accurately in service.

In practicing my invention, I provide a balance indicator arm for such disposition relative to moving bodies or rotating disks and that is so unbalanced by a force or magnetic drag effect from the bodies as to quickly and effectively indicate differences in the relative speeds thereof. Depending upon the construction of the device or upon the control means employed, scales of various characters may be employed with the indicating arm, including a scale in co-operation with which the arm indicates the per cent difference in speeds.

Figure 1:
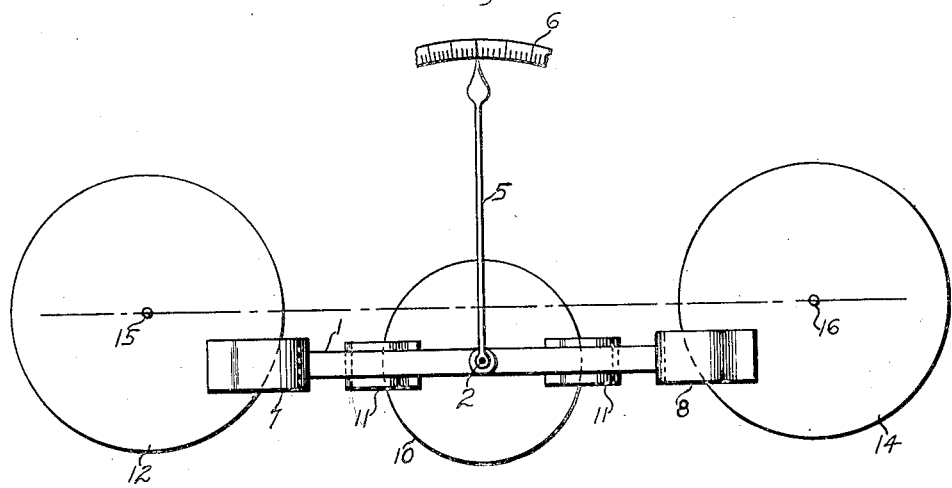
Figure 2:
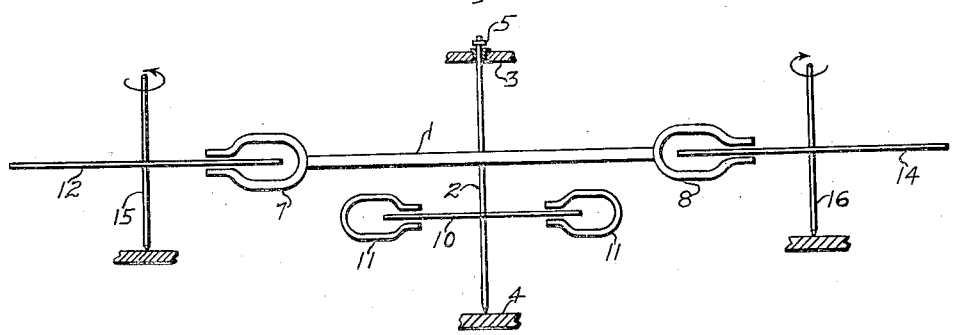

Figure 1 of the accompanying drawings is a plan view of a portion of an indicating device constructed in accordance with my invention, together with the rotating elements of standard and test induction meter elements for co-operation with which my invention is adapted, and Fig. 2 is a side elevational view of the device shown in Fig. 1.

The device comprises, in general, a balance arm member 1 that is mounted on a shaft 2 having upper and lower bearings 3 and 4, respectively, and is provided with a pointer 5 for co-operation with a scale 6 and permanent magnets 7 and 8 adjacent to its ends. A disk 10 and co-operating permanent magnets 11 may be provided for damping movement of the arm in a usual and well-known manner.

In operative position relative to a standard meter disk 12 and a disk 14 of a meter under test, and as viewed from above, the arm 1 lies substantially parallel to, but laterally spaced from, a line between the axes of supporting shafts 15 and 16 of the meter disks 12 and 14, respectively. In this position, and with the magnets 7 and 8 embracing the disks 12 and 14, as shown, movement of the arm 1 about its fulcrum or pivot shaft 2, causes one of the magnets 7 and 8 to increase its magnetic force effect on its corresponding disk and the other to decrease its magnetic force effect on the other disk. Thus, a restoring torque or torque for moving the pointer toward its neutral or zero position is provided when the disks 12 and 14 are rotating at equal speeds.

By properly shaping and disposing the pole-end surfaces of the magnets 7 and 8, the deflection and restoring torques of the device may be caused to vary in any desired manner. Thus, by having the magnetic forces between the magnets and the disks vary uniformly, a uniform scale may be provided, or these forces may be adjusted to provide a scale of other desired character. In operation, with the disks 12 and 14 rotating in opposite directions, when the disks are rotating at the same speed, there will be no deflection of the arm 1, but it will assume its zero position. However, a change in speed of one of the disks, whether it be a decrease or an increase of speed, causes the arm to deflect and the pointer 5 to indicate the degree and direction of change on the scale 6.

As shown in Figs. 1 and 2, with disks 12 and 14 rotating as indicated, magnet 8 moves up if disk 14 is rotated faster than disk 12, and magnet 7 moves down. The effect of the magnetic field due to the magnet 8 decreases, because it is moved toward the center of the disk 14. In like manner, the effect of the magnetic field due to the magnet 7 increases, because it is moved farther from the center of the disk 12. The tendency of the increased speed of the disk 14 to move the member 1 is balanced by the increased drag due to the downward and outward movement of the magnet 7 and the decreased drag due to the upward and inward movement of the magnet 8. The member 1, therefore, takes a position indicative of the percent speed difference between the disks 12 and 14.

The damping disk 10 and its magnets 11 serve to damp out oscillations of the arm 1 and to render the operations thereof more stable.

Since the unbalance of the arm is effected by a force couple acting in opposite directions, the restoring or resetting torque is proportional to these forces and consequently the instrument reads in per cent difference of slip or speed between the disks 12 and 14.

It is contemplated, that for some purposes, it may be desirable to provide a spring either as a substitute for, or in addition to, the disk 10 for controlling the movement of the arm 1.

While I have shown and described a particular form of my invention, changes may be effected thereon, without departing from the spirit and scope thereof, as set forth in the appended claims.

I claim as my invention:—

1. The combination with a plurality of movable elements, of a balanced member having portions spaced from its fulcrum and co-operating directly with said elements in spaced relation thereto to unbalance the member by a drag effect therefrom in accordance with difference in relative movements thereof.

2. The combination with a plurality of movable elements, of a balanced member having portions spaced from its fulcrum and magnetically co-operating directly with said elements in spaced relation thereto to unbalance the member by magnetic drag effect in accordance with difference in relative movements thereof.

3. In a device for indicating relative speeds, the combination with a pair of armature disks for opposite rotation, and an indicator arm balanced in position between, and including magnet portions for direct co-operation with, the disks.

4. In a device for indicating relative speeds, the combination with a pair of armature disks for opposite rotation, and an indicator arm normally balanced in position along a line substantially parallel to, but offset from, a line between the axes of the disks and including magnet portions for direct co-operation with the disks.

5. In a device for indicating relative speeds, the combination with a pair of armature disks for opposite rotation, and an indicator arm normally balanced in position along a line substantially parallel to but offset from a line between the axes of the disks and including magnet members for co-operation with the disks having pole-end surfaces opposite the flat sides of the disks.

6. The combination with the rotating armatures of standard and test meters, of an oscillatable member coacting directly with said armatures.

7. The combination with the rotating armatures of standard and test meters, of a movable member magnetically coacting directly with said armatures.

In testimony whereof, I have hereunto subscribed my name this 30th day of September, 1925.

MONTGOMERY KNIGHT.